(12) United States Patent
Sachdeva et al.

(10) Patent No.: US 7,748,609 B2
(45) Date of Patent: Jul. 6, 2010

(54) SYSTEM AND METHOD FOR BROWSER BASED ACCESS TO SMART CARDS

(75) Inventors: Kapil Sachdeva, Leander, TX (US); Ksheerabdhi Krishna, Austin, TX (US)

(73) Assignee: Gemalto Inc., Austin, TX (US)

( * ) Notice: Subject to any disclaimer, the term of this patent is extended or adjusted under 35 U.S.C. 154(b) by 363 days.

(21) Appl. No.: 11/849,117

(22) Filed: Aug. 31, 2007

(65) Prior Publication Data

US 2009/0064301 A1 Mar. 5, 2009

(51) Int. Cl.
*G06F 7/00* (2006.01)
(52) U.S. Cl. .................................... 235/376
(58) Field of Classification Search ............... 235/375; 726/9
See application file for complete search history.

(56) References Cited

U.S. PATENT DOCUMENTS 6,934,841 B2 * 8/2005 Boyles et al. .............. 713/159
2003/0066893 A1 * 4/2003 Yap et al. .................. 235/487
2007/0300057 A1 * 12/2007 Corcoran et al. ........... 713/154

* cited by examiner

*Primary Examiner*—Michael G Lee
*Assistant Examiner*—Tabitha Chedekel
(74) *Attorney, Agent, or Firm*—Pehr B. Jansson; The Jansson Firm

(57) ABSTRACT

A client-side application extension executable on a host computer from within a web-browser having the capability of executing at least one web-browser add-on to provide a user access to a smart card, connected to the host computer having a smart card resource manager, via the web-browser. The web-browser extension has instructions to direct the central processing unit to access data on the smart card via a web-browser and platform independent interface module and a web-browser and platform dependent wrapper module connected to the web-browser and platform independent interface module and to the smart card resource manager having a function processing module operable to receive a call to the at least one function for accessing data on the smart card and for transforming the function call into a corresponding call to the smart card resource manager.

54 Claims, 14 Drawing Sheets

243

SConnect Whitelist Manager

Authorized Sites
The following websites are permitted to interact with your smart card:

http://www.goodweb.com                    Remove

Forbidden Sites
The following websites are not allowed to interact with your smart card:

http://www.evilweb.com                    Authorize

[ Save Changes ]

*Fig. 12*

SYSTEM AND METHOD FOR BROWSER BASED ACCESS TO SMART CARDS

BACKGROUND OF THE INVENTION

The present invention relates generally to application program access to smart cards, and more particularly to a system and method for allowing user applications executing in a web—browser to access the functions and data in a smart card.

A smart card is a small secure personal computer that lacks input and output devices. Typical applications for smart cards include user authentication, storing private data and use as electronic purses. For these applications, as well as for others, the usual mode of interacting with the smart card is from a host application that is executing on a host computer to which the smart card is connected.

Host application program access to smart-card-based Public Key Infrastructure functionality, for example, is typically achieved through installation of middleware, which provides application program interfaces callable from application programs. The middleware then performs the interactions with the smart card hardware, typically via some form of reader. One commonly available architecture is based on the PC/SC Specifications from the PC/SC Workgroup. FIG. 1 is a block diagram illustrating a high-level view of an implementation of the PC/SC Specification. Smart card aware applications 101 running on a host computer 103 access smart cards 104a-d through a host computer middleware 105 and a smart card resource manager 107. The smart card resource manager 107, in turn, interacts with drivers 109a-d for the various card readers 111a-d to which the host computer 103 is connected.

This architecture presents several problems to the deployment of smart cards. These problems include the requirement of loading a middleware component onto the host computer and making updates to the middleware component. That becomes a particularly undesirable requirement when smart cards are to be used with web-based applications.

Increasingly, web applications have become commonplace and allow for platform-independent access to data and services available over the Internet. For example, web services such as online movie rentals and web-based email applications have become very popular. One advantage of the near ubiquitous deployment of web-connected computers and the wide-spread adoption of web-based applications is that such solutions remove the user from the virtual tether to the user's own computer. For example, by using web-based email services such as Google's Gmail, subscribers to those services can access their email from any computer connected to the web.

Now consider the addition of smart cards to the web-based environment. If a user has a smart card for storing, for example, passwords, account information, or digital certificates, or for performing certain security functions, for example, cryptographic services, and the user wishes to use the smart card while performing some web-based transaction on a computer other than one that belongs to the user, the user would have to install the host computer middleware 105 and possibly an appropriate IFD driver 109 on the particular host computer 103 that the user wishes to use. The owner of that host computer may not have granted the user sufficient privileges for installing middleware software. Furthermore, the owner may not wish to have such middleware software installed on the computer, or if the computer in question is a public computer, for example, one found in a kiosk at an airport or in a library, the person authorized to install the middleware component might not even be available. This problem is one that would stand in the way of a user being able to use a smart card for the security solutions smart cards provide in an environment where such security protections would be of particularly high value. Likewise, updates to the middleware present analogous problems.

An additional issue is that the manner in which web-browsers expose interfaces to middleware. Because popular web-browsers, e.g., Firefox and Internet Explorer, provide different interfaces to middleware, web applications that rely on such middleware have to be web-browser-aware. In other words, the web applications must either be developed specific to each web-browser or must do an internal check to determine which web-browser is being used and have the capability of addressing the appropriate middleware.

These problems are very unfortunate. The web, while becoming a widely used virtual marketplace for a many types of transactions, is also very prone to security issues such as fraudulent use of private accounts, identity theft, and theft of private data. Smart cards are ideally suited for addressing such problems. For example, smart cards may be used for secure storing of user credentials and can be used as an integral component to login processes thereby providing two-factor authentication. However, the necessity of installing middleware on host-computers that a user wishes to employ in accessing web services stands in the way of effective use of smart cards for some such uses.

Smart cards may be advantageously used in conjunction with cryptography services. As such smart cards may be used to store a user's private key and digital certificates. Furthermore, the smart cards may also be used to perform cryptography operations such as encrypting messages, decrypting messages, providing user login, and digitally signing documents using the user's private key. The above—mentioned problems in deployment of smart cards are further aggravated in their use as cryptographic devices.

Since hardware tokens and even software security devices present different interfaces and use different protocols, industry has worked on specifications for accessing the cryptographic capabilities such as storing and accessing certificates, signing or encrypting data, etc., in a hardware neutral way. There are two main competing standards for providing this hardware neutral access to cryptography: Crypto API (CAPI) and PKCS#11. These two standards are largely associated with different operating system platforms and web-browsers. CAPI is the standard used in the Windows operating systems from Microsoft Corporation, Redmond, Wash., and is provided as a standard function of the Windows operating systems. It is the cryptography standard implemented for Microsoft's Internet Explorer. PKCS#11, which was developed by RSA Laboratories, is available in several desktop operating systems and is natively available via the Firefox web-browser from the Mozilla Foundation. There are similarities and there are differences between the two approaches.

In the traditional approach for providing cryptographic services using smart cards, developers would develop host modules for either CAPI or PKCS#11 to be installed as plug-ins to email clients and other applications such as desktop login or Virtual Private Network (VPN). These modules are not part of the underlying operating system installation.

From the foregoing, it will be apparent that there is a need for an improved method to provide web applications access to smart cards.

BRIEF DESCRIPTION OF THE DRAWINGS

FIG. 12 is an example user dialog window allowing a user to manage lists of websites allowed and not allowed to interact with a smart card using a javascript downloaded from a website.

DETAILED DESCRIPTION OF THE INVENTION

Figure 1:
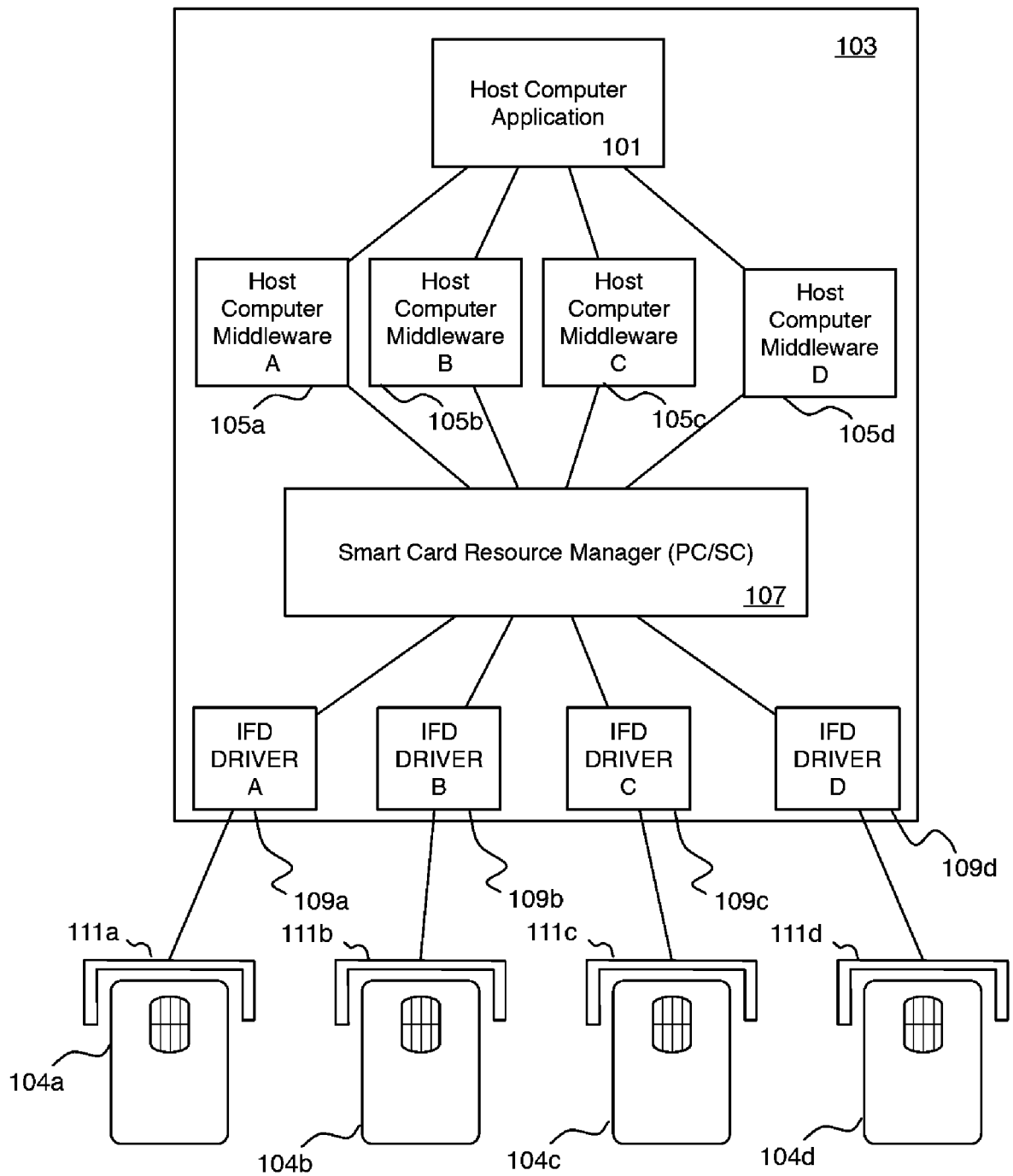
FIG. 1 is a block diagram illustrating a high-level view of an implementation of the PC/SC Specification.
Figure 2:
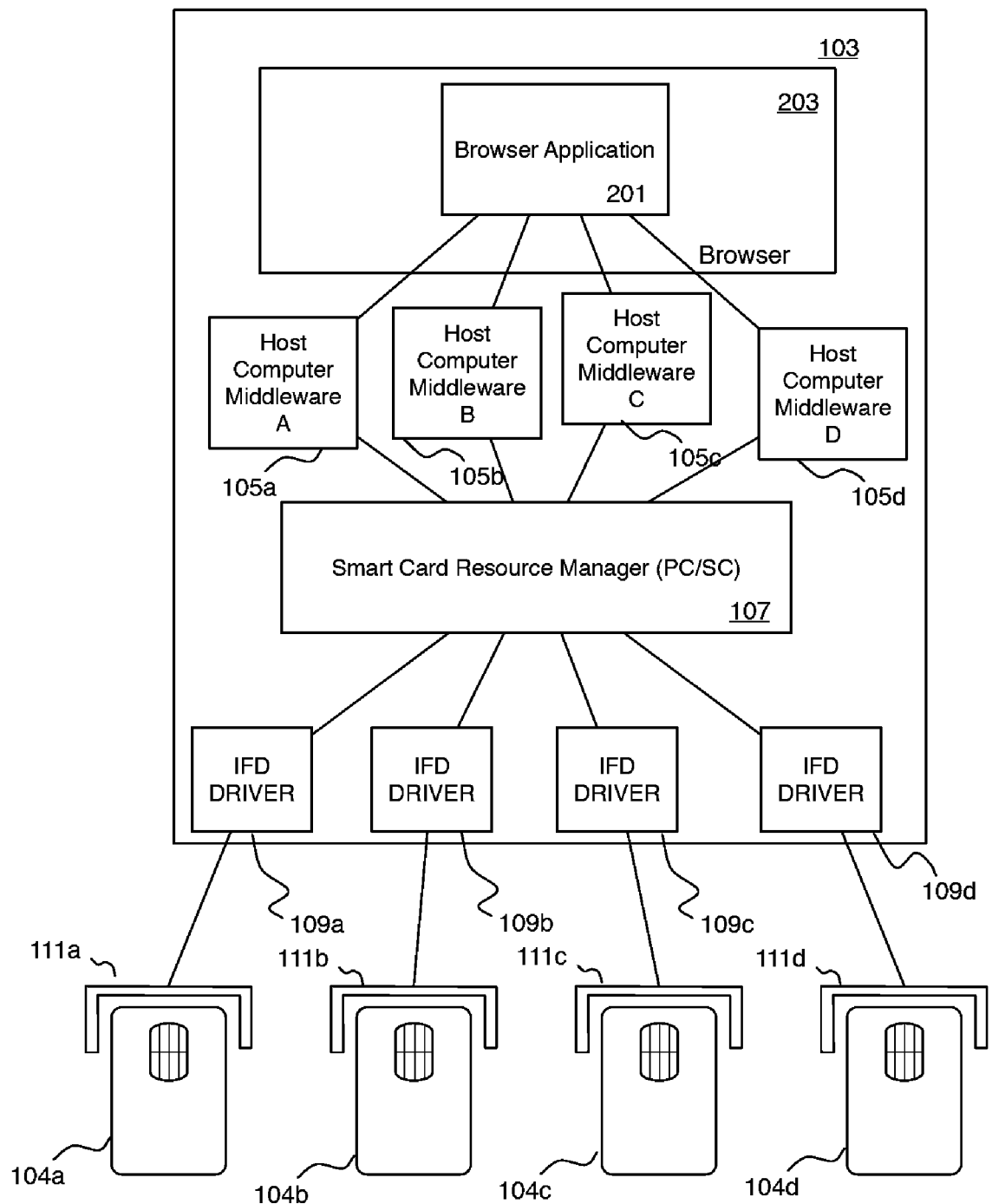
FIG. 2 is a block diagram illustrating a high-level view of the architecture of a smart card of FIG. 1.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment of the invention, a web-browser extension provides an interface between web-browser applications and the smart card resource manager (PC/SC) found in most computers. The web-browser extension insulates the web-browser applications from the smart card resource manager. Furthermore, the web-browser extension, via the smart card resource manager, provides for a communications pipe between web-browser applications and smart cards connected to the host computer 103 on which the web-browser in which the web-browser extension is executing.

Figure 3:
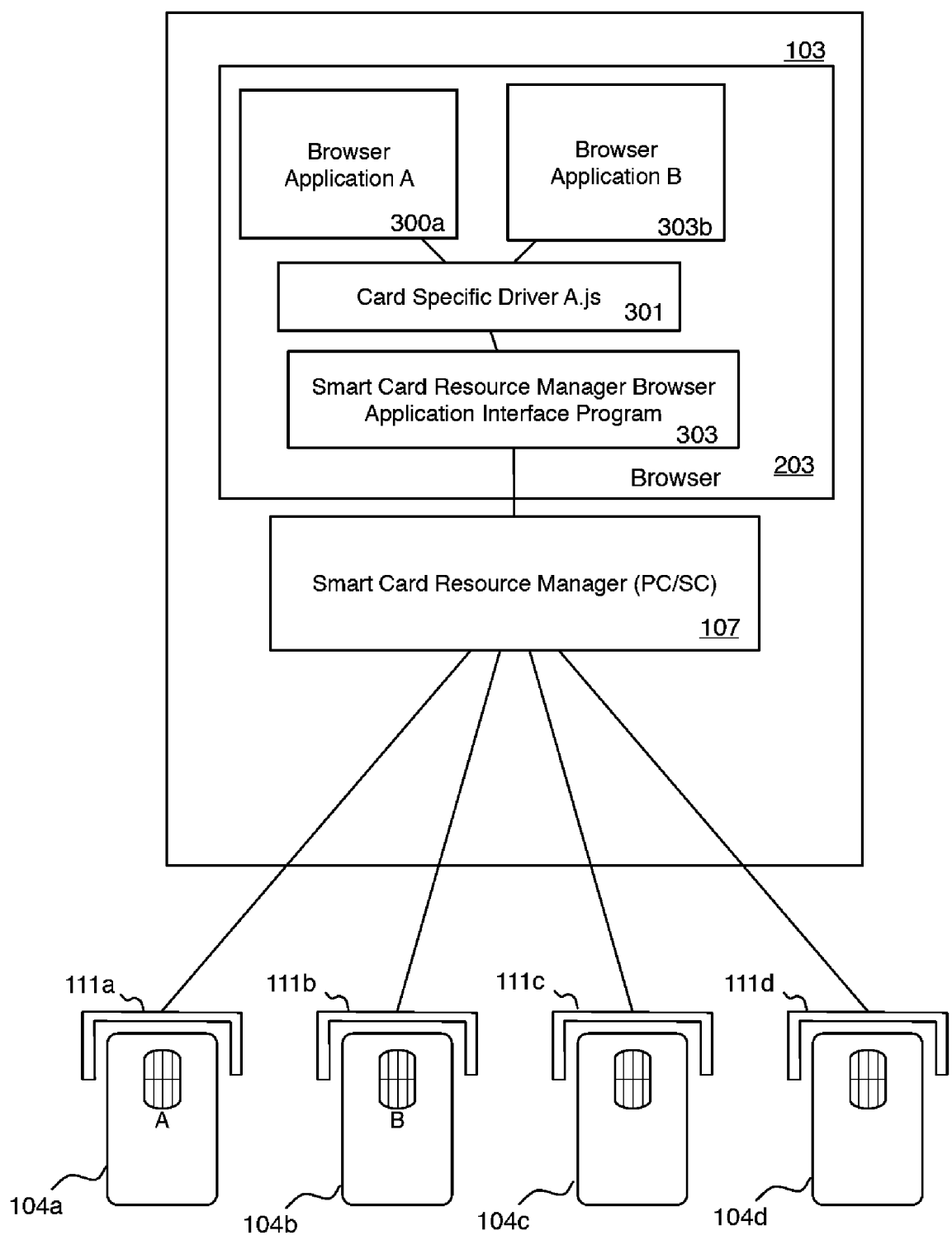
FIG. 3 is a block diagram illustrating an embodiment in which a web-browser application interacts with a smart card.

FIG. 3 is a block diagram illustrating an embodiment in which a web-browser application A 300*a* interacts with a smart card A 104*a*. As in the prior art examples, each type of smart card 104 uses a driver that is specific to that smart card type. In the embodiment of FIG. 3, in a preferred embodiment, that card specific driver is implemented as a script module 301. If the card specific driver 301 has not yet been loaded, it is loaded as described herein below in conjunction with FIG. 9, using, for example, a technique known as on-demand JavaScript.

The card-specific driver 301 communicates with the smart card 104*a* via a smart card resource manager web-browser application interface program 303. The smart card resource manager web-browser application interface program 303 is a web-browser extension combined with a web-browser script, e.g., a JavaScript script, that functions as a wrapper on the smart card resource manager 107.

The smart card resource manager web-browser application interface program 303 provides a connectivity technology that enables web applications to communicate with standard smart cards 104. Host (PC) applications connect to smart cards 104 via a dedicated communication layer called PC/SC in the host operating system. Analogously, a component of a web page or application, which may communicate with the smart card 104, is the embedded script, typically JavaScript. Unless directly built into the web-browser or indirectly via a plug-in, the script in a web page cannot communicate with the hardware of the host machine. The smart card resource manager web-browser application interface program 303 enables the communication channel between JavaScript in a web page and the smart card 104 in a host displaying this web page in a web-browser using the standard host communication framework using classical web-browser techniques of providing such functionality. The smart card resource manager web-browser application interface program 303 is web-browser independent and provides the classical smart card communication APIs in order to minimize the learning curve of developers leveraging this technology to provide smart card connectivity to web applications. Conceptually the smart card resource manager web-browser application interface program 303 provides a connectivity that behaves similar to the XmlHttpRequest object, which enables AJAX web application development. While XmlHttpRequest provides connectivity between JavaScript and the server, the smart card resource manager web-browser application interface program 303 provides connectivity between an application JavaScript, i.e., a web-browser application 101 and the smart card 104.

Figure 4:
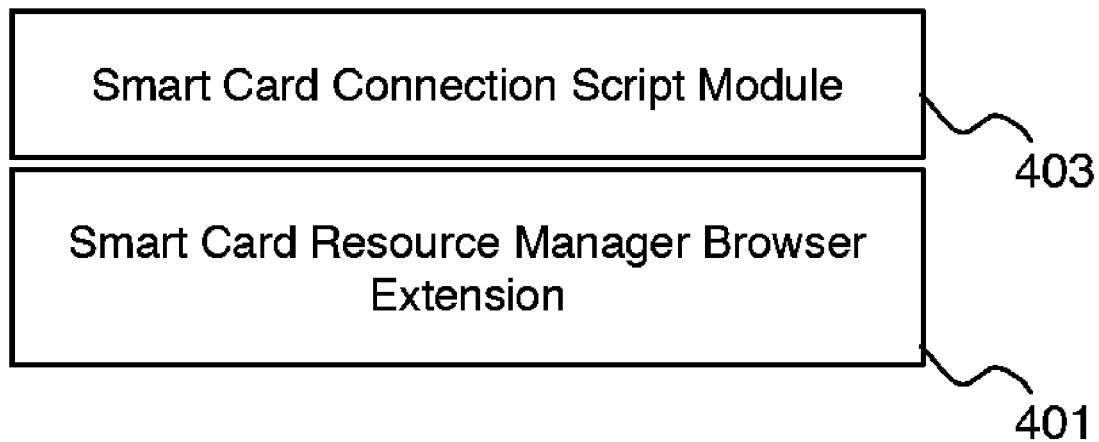
FIG. 4 is a block diagram illustrating one embodiment of the smart card resource manager web-browser application interface program in which the smart card resource manager web-browser application interface program is divided into two parts: a smart card resource manager wrapper web-browser extension and a smart card application interface script module

FIG. 4 is a block diagram illustrating one embodiment of the smart card resource manager web-browser application interface program 303 in which the smart card resource manager web-browser application interface program 303 is divided into two parts: a smart card resource manager wrapper web-browser extension 401 and a smart card application interface script module 403.

The smart card resource manager wrapper web-browser extension 401 is a program that enhances the default functionality of a web web-browser to create a channel to the PC/SC implementation. Each web web-browser 203 (e.g., Firefox from the Mozilla Foundation, Internet Explorer from Microsoft, Safari from Apple Inc., of Cupertino, Calif., Opera from Opera Software ASA of Oslo, Norway) has its own prescribed means of creating extensions. Therefore, a corresponding smart card resource manager wrapper web-browser extension 401 is available for each supported web-browser. The extensions are accessible via JavaScript.

As mentioned above web-browsers have different ways of writing extensions and in some cases have different ways of interacting. In order to provide a productive environment for developers, a library script, which hides all the web-browser dependent code from the developer, is made available via the smart card application interface script module 403. The smart card application interface script module 403 provides an object oriented interface to the PC/SC layer that insulates the application programs 101 from the unique ways in which web-browsers expect extensions to be written and interact.

Table 1. Is an example web-browser application 101 that accesses a smart card 104. In the example of Table 1,

TABLE 1

Code for a basic web application using the
Smart Card Resource Manager Wrapper.js

```
<html>
  <head>
    <script src="sconnect.js" language="javascript"></script>
    <script language="javascript">
      function RunDemo( ){
        // instantiate the PCSC class
            var pcsc = new SConnect.PCSC( );
        // get the name of readers which have smart cards
            // inserted in them.
            var readers = pcsc.listReaders(1);
        // connect to the first reader
            var res = pcsc.connect(readers[0],
                          SCardAccessMode.Shared,
SCardProtocolIdentifiers.T0);
            if (res === false) {
                // error connecting.
                    alert("problem connecting to
                        reader-" + readers[0]);
                    return;
            }
        // send an APDU to the card, return value will be
        // the status word
            res = pcsc.transmit("00A4040008112233445566778");
        // if card requires GetResponse APDU (00C00000XX)
        // then it is better to use exchangeAPDU method
            res =
   pcsc.exchangeAPDU("B03800000B0102030411220908070605");
            // disconnect with LeaveCard disposition mode
            pcsc.disconnect(SCardDisposition.LeaveCard);
            // dispose the pcsc object to release the resources
            pcsc.dispose( );
      }
    </script>
  </head>
  <body>
    <input type="button" value="Click me" id="but1"
onclick="RunDemo( );">
  </body>
</html>
```

The code of Table 1 a basic web page executing a script (JavaScript), which communicates with the smart card by sending APDUs. The code of Table 1 begins with loading the smart card application interface script module 403 (in the example, the smart card application interface script module 403 is called SConnect.js). The application interface module 403, i.e., the sconnect.js script library included at the start of web page through the statements:

```
<script src="sconnect.js"
    language="javascript"></script>
``` takes care of web-browser dependent code. Thus freeing the web developer to focus on smart card interaction logic.

The smart card application interface script module 403 is either already loaded in a web-browser session or may be loaded from the remote server site that the user is interacting with.

An application program 300 typically starts with creating an object of SConnect.PCSC class. The constructor, (a constructor is a special block of instructions in a class that are executed when an object is created) that creates the object instantiates the web-browser specific smart card resource manager wrapper web-browser extension 401 if it is installed. Otherwise the constructor throws a System.BrowserExtensionNotInstalledException. Successful creation of the object finishes with the call to establishContext in the smart card resource manager wrapper web-browser extension 401 (equivalent to SCardEstablishContext of PC/SC API). Following line shows how to create an object of SConnect.PCSC class.

var pcsc=new SConnect.PCSC( );

On the other hand, if the System.BrowserExtensionNotInstalledException is thrown by the <script . . . > command, the user executing the web application is invited to install the Smart Card Resource Manager Wrapper.js 303 from a remote server.

Thus, the call var pcsc=new SConnect.PCSC( );

creates a new object—pcsc. The pcsc object has methods that are callable from the web-browser application programs 300. These methods have counterparts in the smart card application interface script module 403, which in turn has counterpart functions in the smart card resource manager (PC/SC) 107. Thus, the smart card resource manager wrapper web-browser extension 401 provides an object-oriented interface to the smart card resource manager (PC/SC) 107 callable by the web-browser application programs 300.

Figure 5:
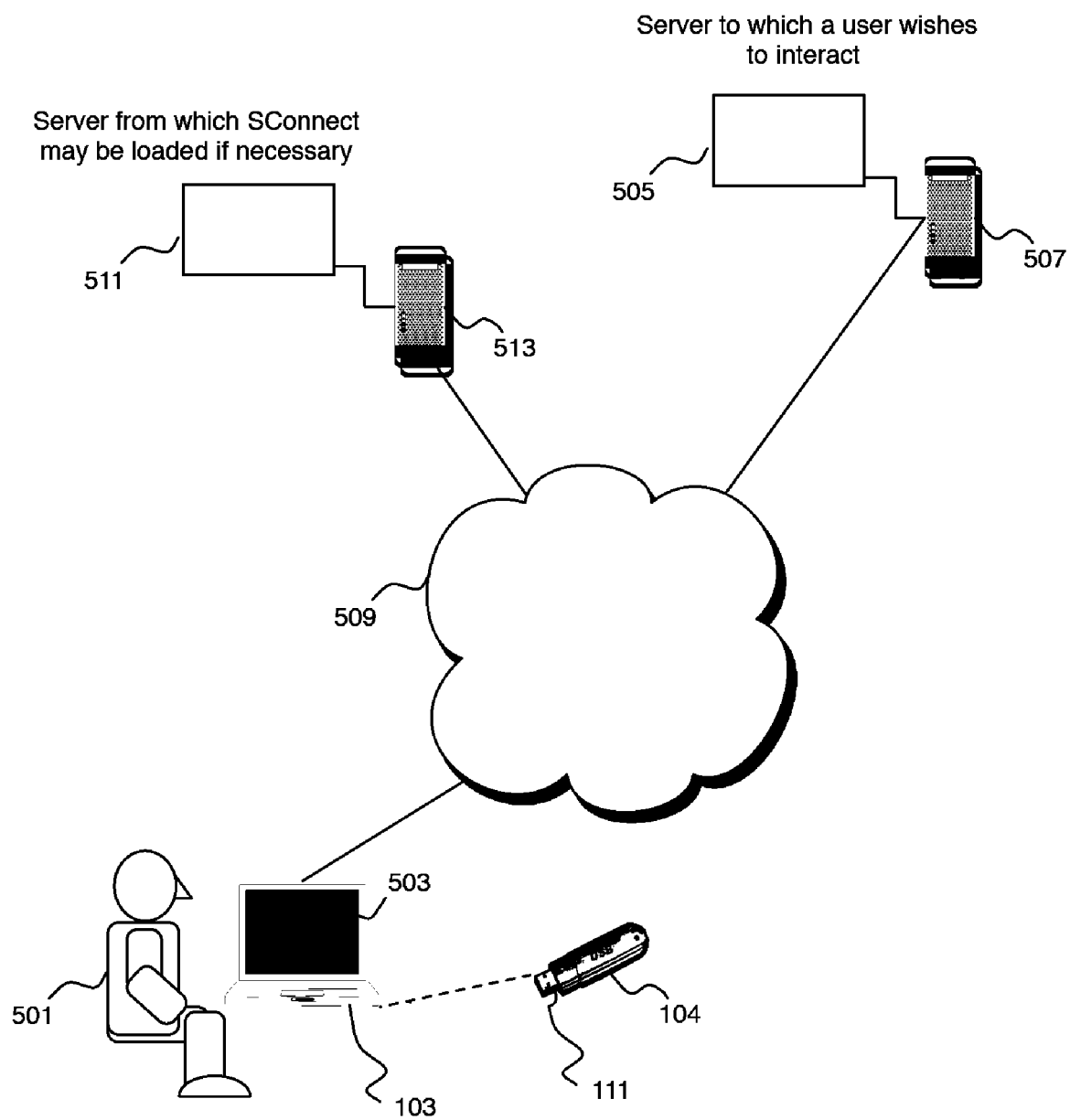
FIG. 5 is a schematic illustration of a network in which a user may be attempting to execute a web page.

FIG. 5 is a schematic illustration of a network in which a user 501 may be attempting to execute a web page. The user 501 is operating a web-browser 203 displaying a window 503 on a host computer 103. The user wishes to interact with a remote web server 505 executing on a remote computer system 507 perhaps for performing some form of online transaction over a network 509. To secure the transaction, the user 501 uses a smart card 104 connected to the host computer 103 via an interface device 111.

As part of a web-browser session, the smart card resource manager wrapper web-browser extension 401 may have already been installed. In one alternative embodiment, the smart card resource manager wrapper web-browser extension 401 is not installed into the web-browser 203. In the case the smart card resource manager wrapper web-browser extension 401 is already installed the user is not prompted to install the smart card resource manager wrapper web-browser extension 401. On the other hand, if the smart card resource manager wrapper web-browser extension 401 has not been installed the user 501 is invited to load the smart card resource manager wrapper web-browser extension 401 from a server (e.g., www.sconnect.com) 511 running on a remote server system 513. Alternatively, the provider of the web page being executed by the user 501 may provide the smart card resource manager wrapper web-browser extension 401 from a web site operated by the provider.

Since a host computer 103 may have many smart card readers 111 attached thereto, the smart card resource manager web-browser application interface program 303 provides a way to list the readers using the listReaders(readers With- Card) function. Specifying an argument value "true" would list only those readers which have smart card inserted in them else name of all readers are returned.

var readers=pcsc.listReaders(true);

This call on the list Readers method of the pcsc object, causes a call on the corresponding function in the smart card resource manager wrapper web-browser extension 401, for example, a function called PCSC-SCardListReaders which calls the SCardListsCards( ) function of the smart card resource manager (PC/SC) 107.

Next step is to connect to the reader 111 specifying its name, mode of connection (Shared, Exclusive or Mutual) and protocol identifier (T0 or T1). A return value of true indicates successful creation.

```
var res =
  pcsc.connect(readers[0],SCardAccessMode.Shared,SCard
  ProtocolIdentifiers.T0);
```

At this point the web-browser 203 is ready to send the commands to the reader, and via the reader to the smart card 101, to which a successful connection has been made. In an embodiment, the commands are transmitted in the ISO-7816 APDU format. In PC/SC, this is done by using SCardTransmit API. In one embodiment, the smart card resource manager wrapper extension 303 provides an API transmit(command) to do this.

```
var response =
  pcsc.transmit("00A4040008112233445566 7788");
```

In such a typical interaction with a smart card 104, the response is a status word and data. A status word is a 2 byte value whose meaning most of the time is to be interpreted by the host application whereas certain status words are standardized and specified by ISO7816-4.

```
var statusWord = response.StatusWord;
var retVal = response.retVal;
```

One such status word is 61XX where XX denotes the number of bytes to be retrieved by the host application using the GetResponse command (00C00000XX). Because often a sequence of retrieval operations is required to retrieve the response data using the GetResponse, command, one embodiment includes an exchangeAPDU method to perform the sequence of GetResponse commands until all the data has been retrieved.

```
response =
  pcsc.exchangeAPDU("B03800000B0102030411220908070605"
  );
```

Finally, the application 101 disconnects the reader 111 and releases the resources by calling the dispose method of the SConnect.PCSC class. In PC/SC, at the time of disconnecting (using SCardDisconnect API) a disposition mode can be specified which specifies the action to be taken on smart card before disconnecting. Examples of these actions are Leave-Card, ResetCard, UnpowerCard and EjectCard. If the disconnect function is not used then dispose disconnects using the LeaveCard action.

```
pcsc.disconnect(SCardDisposition.LeaveCard);
pcsc.dispose( );
```

Figure 6:
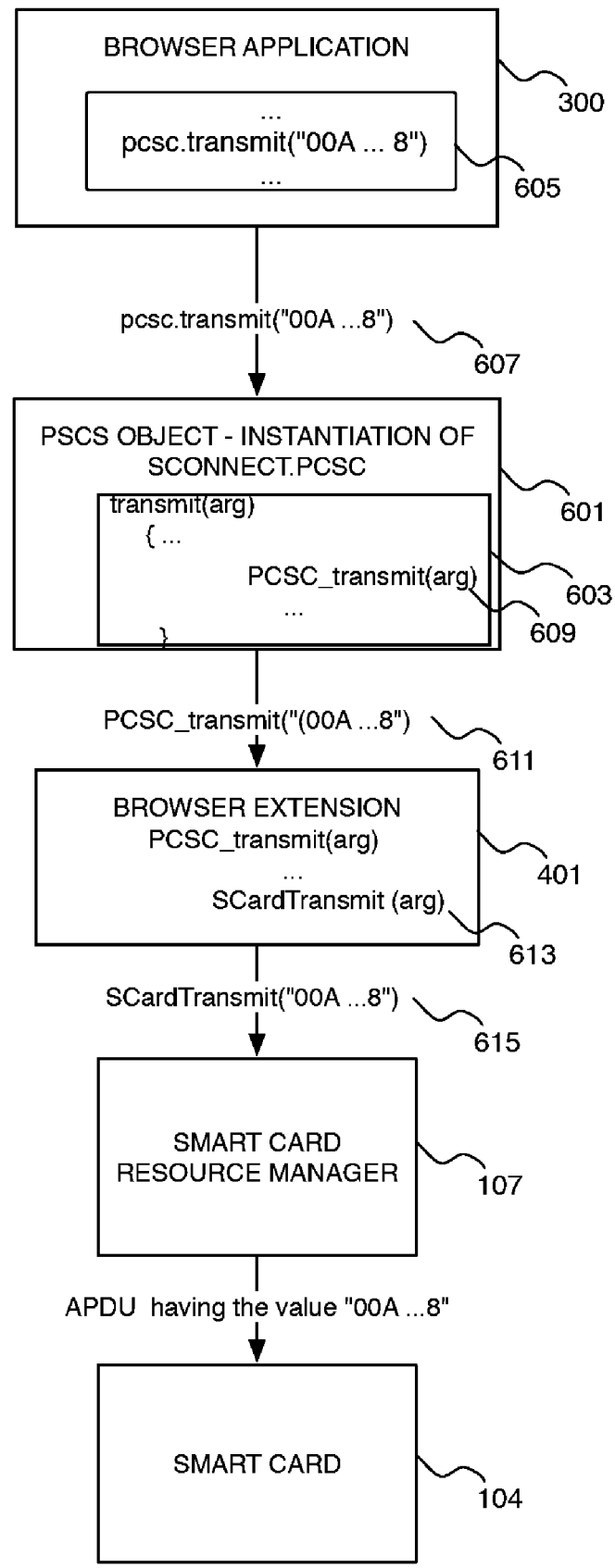
FIG. 6 is a block diagram illustrating the instantiation of the SConnect.PCSC class and the use thereof for communicating with a smart card.

FIG. 6 is a block diagram illustrating the instantiation of the SConnect.PCSC class and the use thereof for communicating with a smart card. When the web-browser application executes the "pcsc=new SConnect.PCSC" instruction, an instance 601 of the SConnect.PCSC class is instantiated. The object 601 contains a method transmit 603 with at least one argument; typically this would be through inheritance from the SConnect.PCSC class. The argument being the APDU message to be transmitted to the smart card 104.

The web-browser application 300 may include at least one instruction 605 that is a call on the transmit( ) method 603 of the PCSC object 601, the execution of which causes a call on the transmit method of the pcsc object 601, message 601, with the particular APDU argument to be transmitted to the smart card 104.

The SConnect.PCSC class definition provides that the transmit method causes a call to the PCSC_transmit function, instruction 609. The PCSC_transmit function is a function of smart card resource manager wrapper web-browser extension 401. Thus, the execution of the function call to the PCSC_transmit function, instruction 609, causes a function call 611 that passes on the APDU being transmitted to the smart card 104.

The implementation of the PCSC_transmit function in the smart card resource manager wrapper web-browser extension 401 contains an instruction 613 to call the SCardTransmit function of the smart card resource manager (PC/SC) 107. The execution of that instruction causes the corresponding function call 615 to the smart card resource manager (PC/SC) 107.

The SCardTransmit function of the smart card resource manager (PC/SC) 107 causes the transmission of the APDU received by it through its argument list to the smart card 104.

If the smart card resource manager wrapper web-browser extension 401 has been installed, a smart card insertion event detected by the smart card resource manager 107 is transmitted to the smart card resource manager wrapper web-browser extension 401. Upon detecting insertion of a smart card 104 or the attempted use of a smart card 104 to which the user 501 has not been authenticated, would require the user 501 to successfully authenticate himself. Accordingly, when the smart card resource manager wrapper extension 303 informs the calling web-browser application 300 that a smart card 104 has been inserted and the web-browser application 300 attempts to call functions in the smart card resource manager wrapper web-browser extension 401, the smart card 104 or the smart card resource manager (PC/SC) 107 would return an indication that the user has or has not been authenticated. In the latter event, the web-browser application 300 may display a login screen to provide the user 501 a mechanism for login in to the smart card 104.

Figure 7:
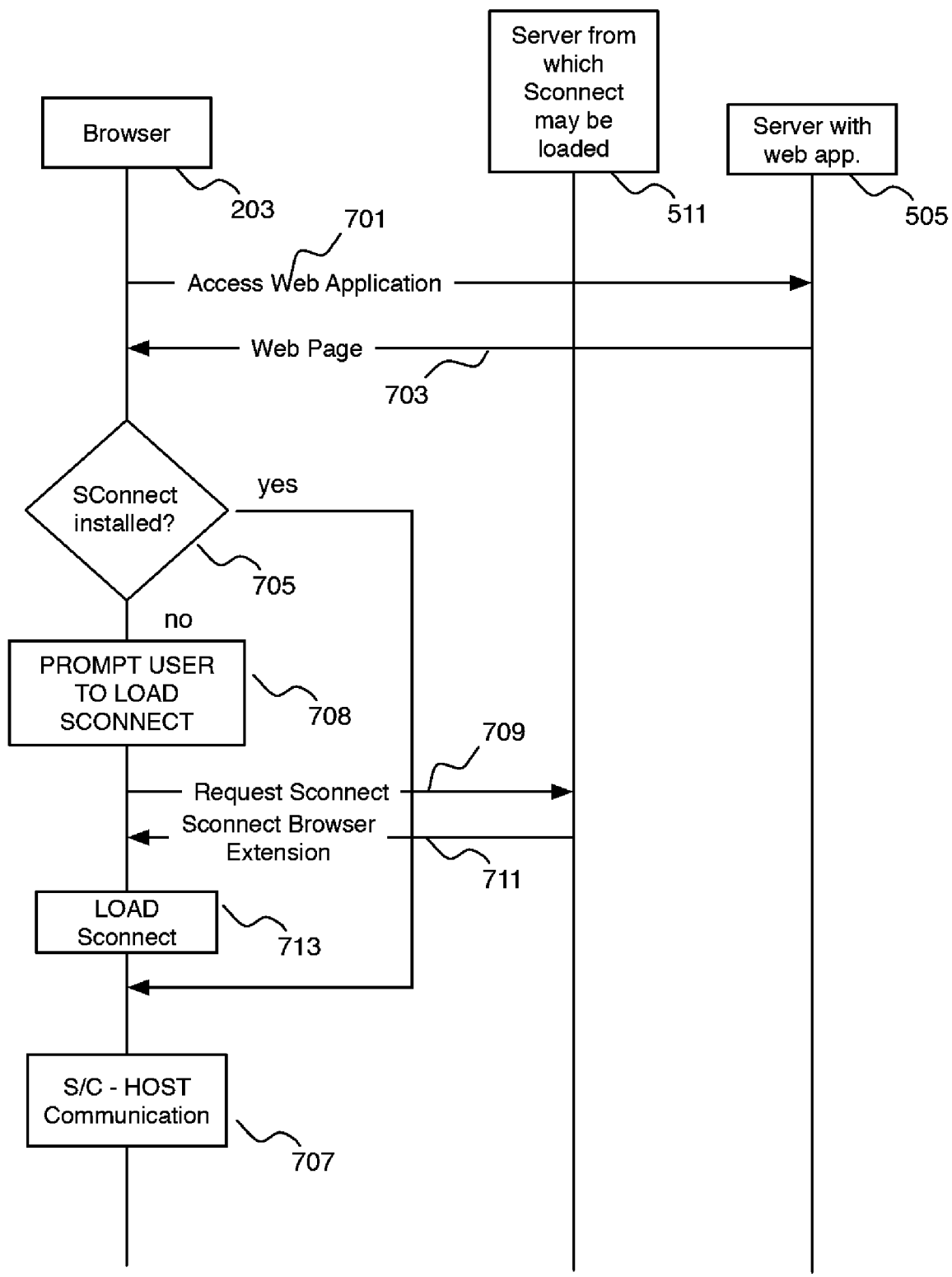
FIG. 7 is a timing-sequence diagram illustrating the message flow when a user attempts to execute a web application requiring the use of a smart card.

FIG. 7 is a timing-sequence diagram illustrating the message flow when a user 501 attempts to execute a web application requiring the use of a smart card 104. The user 501 executes a web web-browser 203 on the host computer 103. The user 501 attempts to access the web application on the remote server 505, step 701. The web page corresponding to the web application is transmitted to the web-browser 203.

The web application includes a call to the smart card resource manager wrapper extension 303 script. If the smart card resource manager wrapper extension 303 has been installed into the web-browser 203, step 705, communication with the smart card 104 may commence, step 707.

On the other hand, if the smart card resource manager wrapper web-browser extension 401 has not been installed, the user 501 is prompted to download (if necessary) and install the smart card resource manager wrapper web-browser extension 401, step 708. This would typically be performed by providing the user 501 with a link to click on that will cause a request for the smart card resource manager wrapper web-browser extension 401 from the server 511 from which the smart card resource manager wrapper web-browser extension 401 may be loaded, step 709. In response, the server 511 returns the smart card resource manager wrapper web-browser extension 401, step 711, and the smart card resource manager wrapper web-browser extension 401 is loaded into the web-browser 203, step 713. Communication with the smart card 104 may occur, step 707.

Web-browser applications typically execute in one thread. A thread is one sequence of instructions that may execute in parallel with other threads but within which the instructions follow each other. Typically interactions with a smart card 104 can be relatively time consuming. Because of this delay when the instructions of the application are executing in one thread, a command to either connect to the smart card 104 or a command issued to the smart card 104 may result in a very unpleasant user 501 experience in which the web-browser 203 session may seemed locked up. A better approach is to either allow the user 501 to continue interacting with the web page or to display some status information, e.g., a status progress bar.

In one embodiment, the operation to connect to the smart card 104 or commands communicating with the smart card 104 are performed asynchronously. Table II is a code segment illustrating asynchronous transmission of a command to a smart card 104.

TABLE II

Code for Asynchronous Execution of Smart Card Commands

```
<script language="JavaScript">
  var responseSuccess = function(o){
    alert("Status word is:" + o.statusWord);
    alert("Return value is:" + o.retVal);
  };
  var responseFailure = function(o){
    alert("Exception is:" + o.exception);
  };
  var callBack = {
    success : responseSuccess,
    failure : responseFailure
  };
  function RunDemo( ){
    ...
    ...
    pcsc.async_transmit("00A40400081122334455667788",callBack);
  }
</script>
```

To provide for the creation of asynchronous commands, the smart card resource manager wrapper web-browser extension 401 includes a function that provides for a callback upon the conclusion of the execution of the command by the smart card resource manager (PC/SC) 107. Thus, the smart card resource manager wrapper web-browser extension 401 provides the async_transmit function. Its first argument is an APDU packet for transmission from the host computer 103 and the second argument is a function called upon return from the command. The "callback" function typically specifies some actions to be taken depending on the result obtained from the execution of the command by the smart card 104 or the smart card resource manager (PC/SC) 107.

Figure 8:
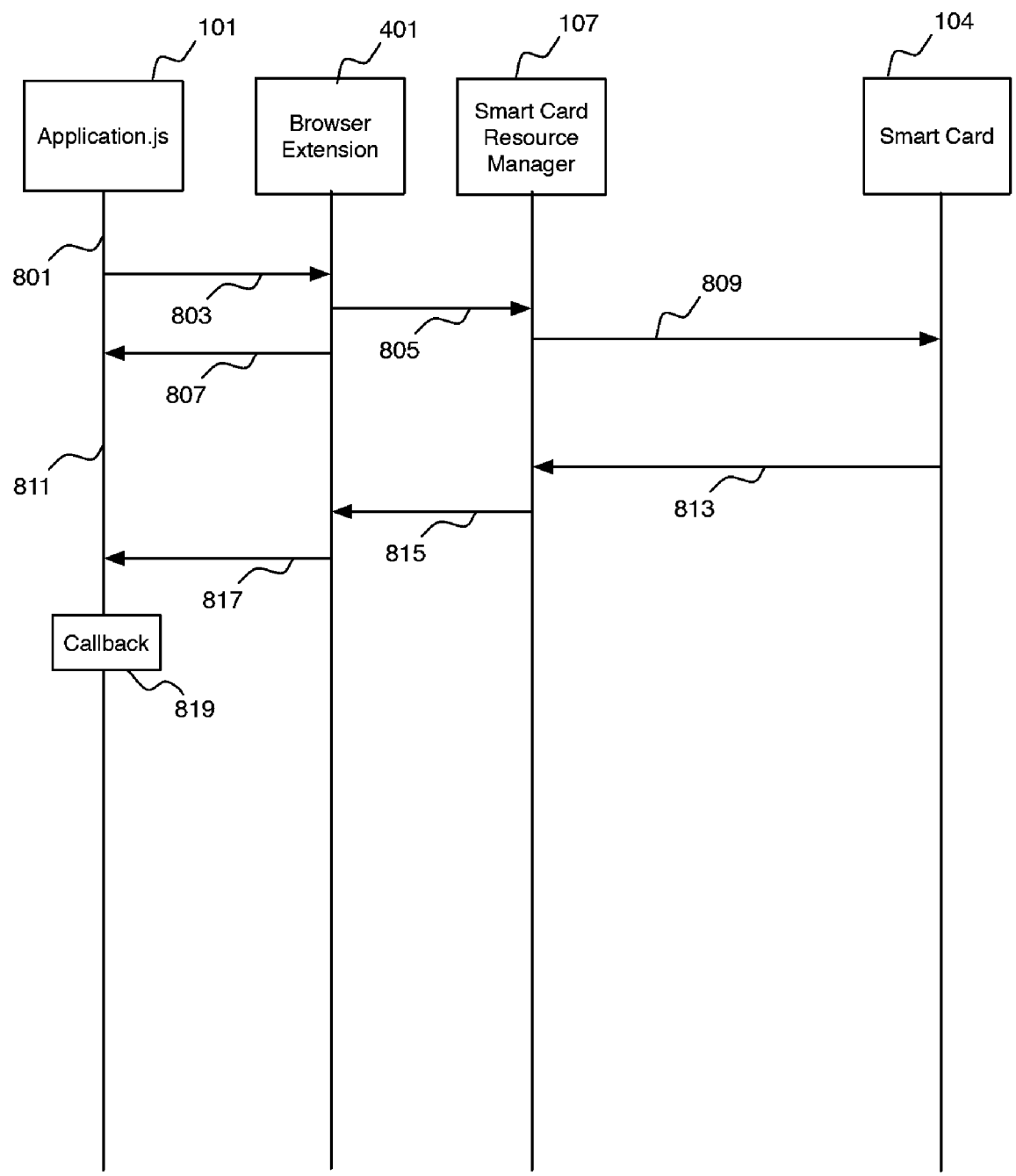
FIG. 8 is a timing-sequence diagram illustrating message flow and timing that occurs during the creation of asynchronous commands to the smart card.

FIG. 8 is a timing-sequence diagram illustrating message flow and timing that occurs during the creation of asynchronous commands to the smart card 104. For this example, consider the application 101 to be the code of Table II. The host computer 103 is executing the RunDemo function, location 801. When the host computer 103 encounters the pcsc.async_tranmsit function, the host computer 103 transfers control over to the smart card resource manager wrapper web-browser extension 401, transition 803. The pcsc.async_transmit function issues a transmit( ) call 805 to the smart card resource manager 107 in a new thread. The application 101 continues executing after the call, 807. In the new thread spawned by the call to pcsc.async_transmit, the smart card resource manager 107 transmits the command to the ifd 111 (not shown) and ultimately to the smart card 104, step 809. While these interactions take place between the smart card resource manager 107 and the smart card 104, the application 101 continues executing 811 in the original thread.

At some point after the connection attempt, the smart card 104 responds 813 and the smart card resource manager 107 returns a status to the application 101 via the return to the async_transmit( ) function of the smart card resource manager wrapper web-browser extension 401, steps 815 and 817. With a second argument to the async_transmit( ) function specifying that the "callback" function is to be called on the return from the second thread, the host computer 103 transfers control to the callback( ) function of the application 101, step 819.

A very similar asynchronous mechanism may be employed in establishing connections to the smart card 104. The principal difference being that to connect, a different command is employed.

Figure 9A:
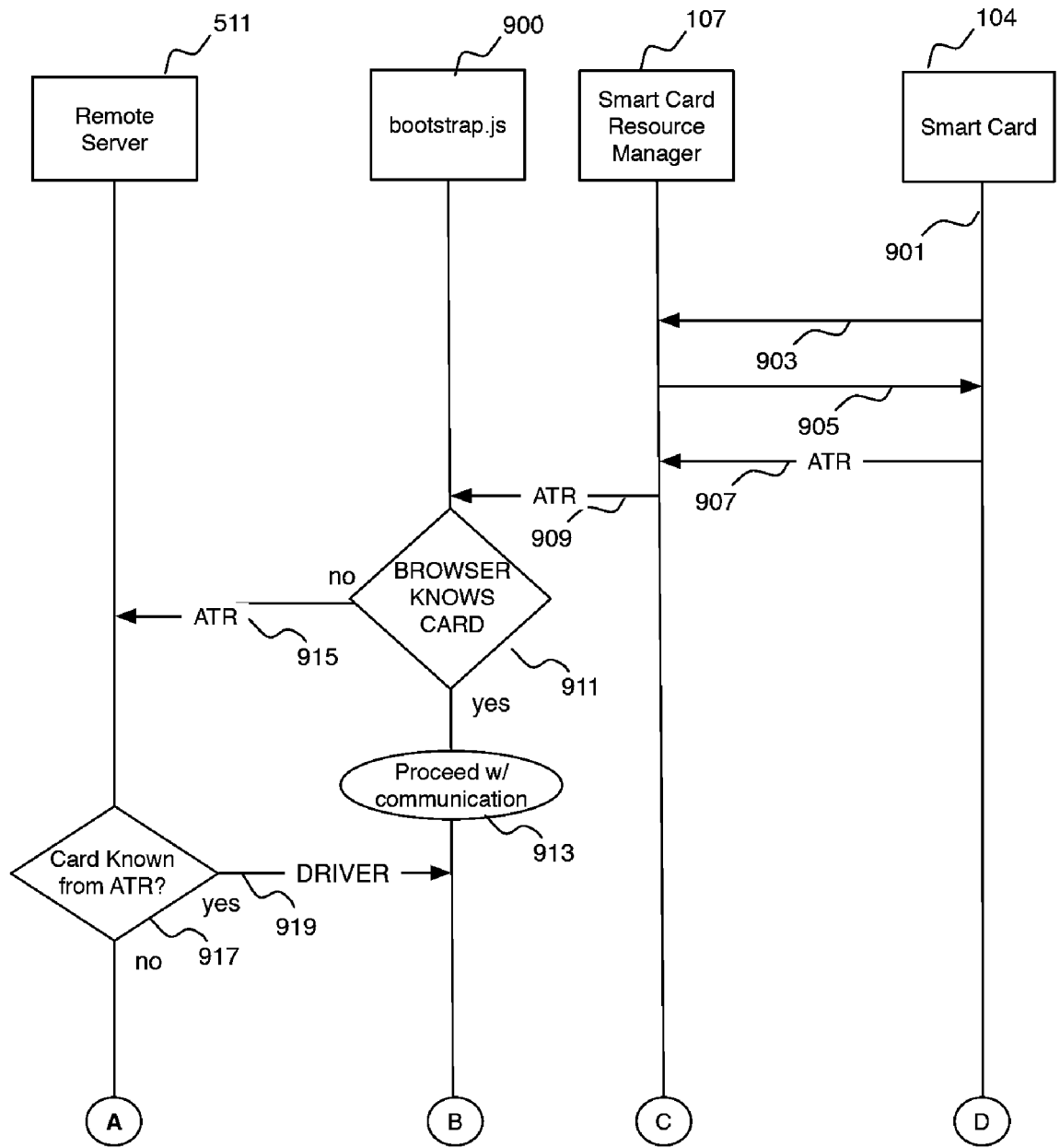
FIG. 9 is a timing sequence diagram illustrating the sequence for obtaining a card-specific driver from a remote server executing on remote computer system.
Figure 9B:
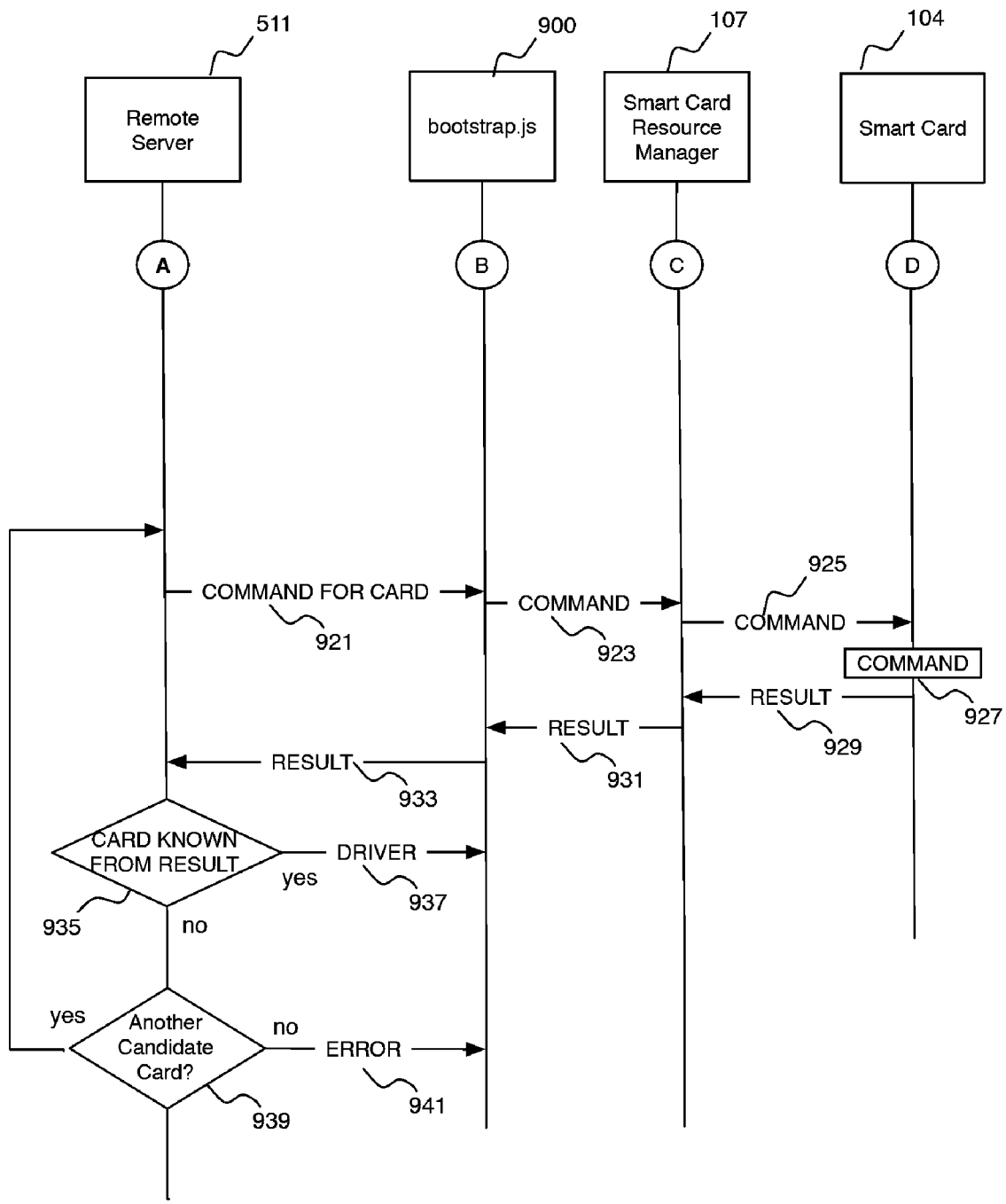

As discussed hereinabove, if a card-specific driver 301 for a particular smart card 104 has not yet been installed, upon detecting a new smart card 104 the smart card resource manager wrapper extension 303 causes the execution of a card-specific driver 301 obtained from the remote server. FIG. 9 is a timing sequence diagram illustrating the sequence for obtaining a card-specific driver 301 from a remote server 511 executing on remote computer system 513. If card-specific driver 301 has not been loaded, a bootstrapping script 900 is executed to cause the download of the correct card-specific driver 301 from a remote server 511, if that remote server 511 has a card-specific driver 301 available for the card in question.

A smart card 104 is physically connected to the host computer 103, step 901. This triggers a smart card insertion event detected by the smart card resource manager 107, step 903. The smart card resource manager (PC/SC) 107 provides APIs and events so that the smart card resource manager web-browser application interface program 303 can monitor card insertion and removal through an event-loop. The smart card resource manager 107 transmits a request for the smart card 104 to do an answer to reset (ATR) 905. The smart card 104 responds with the ATR 907, which is transmitted to the web-browser 203; specifically to the smart card resource manager web-browser application interface program 303, step 909.

If the smart card resource manager web-browser application interface program 303 can determine that the appropriate card-specific driver 301 has already been loaded, step 911, the web-browser 203 can proceed with the communication with the card, step 913. Otherwise, the ATR is transmitted to the remote server 511. The remote server 511 determines whether it can identify the smart card 104 from the ATR, step 917. In many cases the type of smart card 104 can be identified from a field in the ATR known as the historical bytes. If the smart card 104 type can be determined form the ATR, the card-specific driver 301 is transmitted back to the host computer 103, step 919.

If the server 511 cannot identify the smart card 104 from the ATR, the remote server 511 transmits a message back to the host computer 103 indicating that the smart card 104 could not be uniquely identified from the ATR, message 921. In the message 921, the remote server 511, includes a command for the smart card 104 to execute. The command is selected to be a command that reveals the capability of the smart card 104. For example, to test whether the smart card 104 is a JavaCard, the command may be a getStatus( ) request to the smart card 104 in response to which the smart card 104 identifies the applications which the smart card 104 supports by returning application identifiers (AIDs) for the supported applications; for a native smart card 104, the command may be an operation known to be supported by the particular native smart card 104 to be tested for, in which case the expected return would be the expected result from that operation; for example, for a Gemalto.NET card from Gemalto Inc., Austin, Tex., the test command may be to inquire if the smart card 104 supports a service called mscm.

The bootstrap script 900 receives the command and forwards the command to the smart card resource manager 107, step 923, which in turn forwards the command to the smart card 104, step 925. The smart card 104 executes the command, step 927 and returns the result, step 929. The result is then forwarded to the bootstrap script 900, step 931, and the remote server 511, step 933. The remote server 511 determines from the result whether the smart card 104 is known and has a supported driver, step 935. If the remote server 511 determines that the smart card 104 answered as the smart card 104 that the server 511 was testing for, the server 511 transmits the card-specific driver 301 back to the host computer 103, step 937. In one embodiment, what is sent back to the host computer 103 is a link to download the card-specific driver 301.

On the other hand, if the result returned from the smart card 104 does not match the expected result for the smart card 104 being tested, the server 511 may try another smart card 104, step 939. If there are more smart cards 104 to test for, the remote server 511 returns with another command to be executed by the smart card 104, step 921. However, if there are no more smart cards 104 to test for, i.e., the smart cards 104 for which the server 511 has card-specific driver 301 for have all been tested, an error message indicating that the smart card 104 is not supported is returned to the host computer 103, message 941.

It should be noted that while the same server 511 is used for downloading the smart card resource manager wrapper web-browser extension 401 (as described hereinabove) that is merely for illustrative purposes. The card-specific driver 301 and the smart card resource manager wrapper web-browser extension 401 may be loaded from entirely unrelated remote servers.

As discussed hereinabove, cryptography services are one of many important applications of smart cards 104. Hitherto cryptography solutions have been very cumbersome to implement because of the legacy of having two incompatible and competing systems, PKCS#11 and CAPI. Traditionally, smart card application developers wrote and deployed host modules for PKSC#11 and CAPI. As discussed above, that presented several undesirable consequences.

By using the hereinabove described technology using the smart card resource manager web-browser application interface program 303 (e.g., the combination of a smart card resource manager wrapper web-browser extension 401 and smart card application interface script module 403, as described hereinabove), the bootstrapping script 900, and the associated process flow, an application developer is able to avoid being dependent and burdened by the cryptography middleware on the host computer 103.

Consider a scenario in which a smart card 104 has PKCS#11 capabilities and a developer wishes to develop an application in which the smart card 104 is used to digitally sign email messages using those cryptography capabilities. That particular application 101 would then be developed on the smart card resource manager wrapper extension 303 via the card-specific driver 301 (loaded using the bootstrapping script 900) to directly access those cryptography capabilities.

Figure 10:
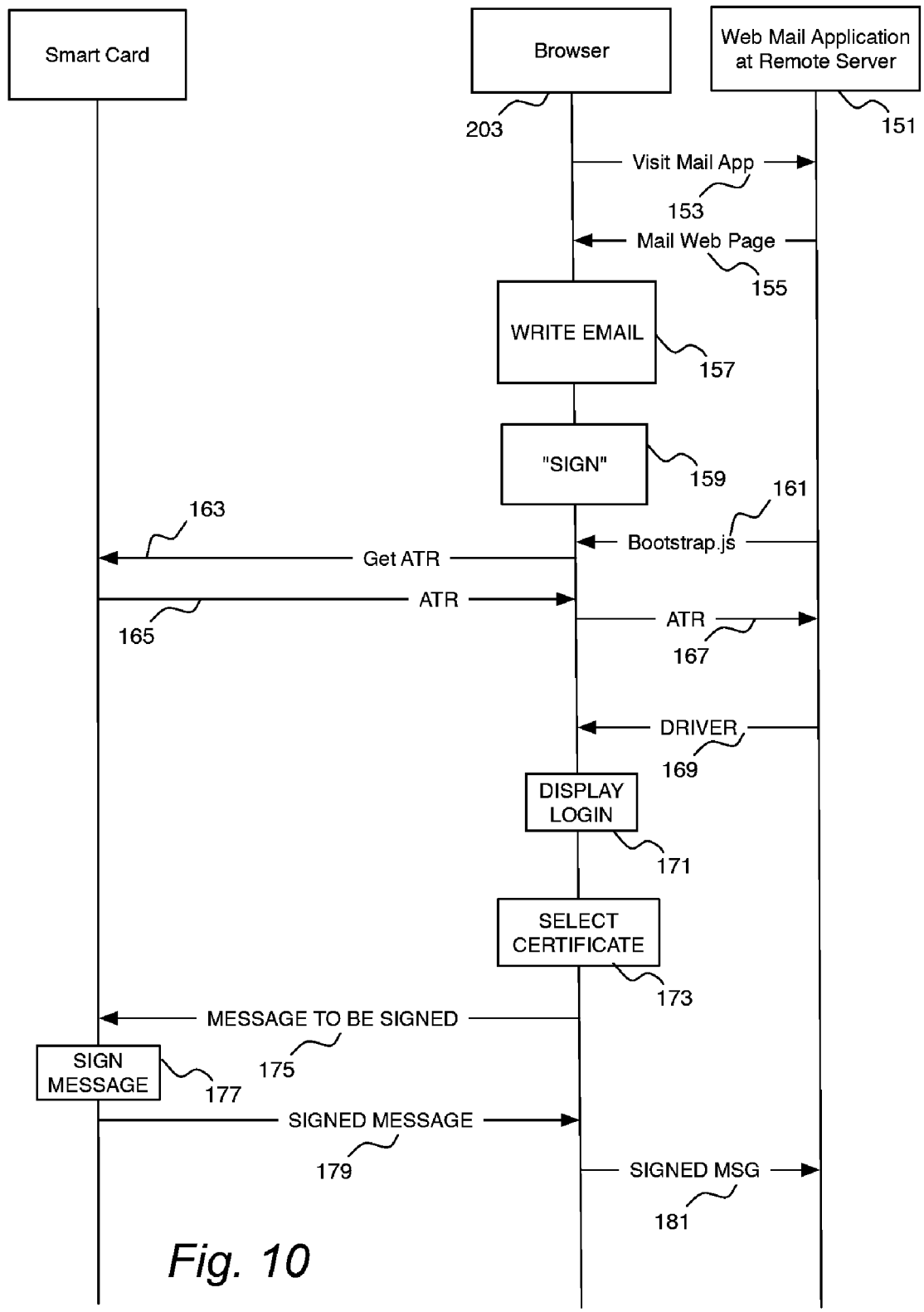
FIG. 10 is a timing sequence diagram illustrating that process flow.

FIG. 10 is a timing sequence diagram illustrating that process flow.

The workflow of this implementation in the context of our web application is as follows. Consider a user 501, Alice, wishing to sign an email message using the PGP key stored on her smart card 104.

- Alice visits Secure Society's SMail 151 (i.e., and application running on a remote web server), step 153, via its web interface, message 155, using, for example, the Firefox web-browser 203.
- Alice has written an email, step 157, which she wants to sign using her PGP key stored in her smart card 104. She clicks on the sign email icon/button, step 159. If the Firefox web-browser 203 is not SConnect enabled, i.e., the smart card resource manager wrapper web-browser extension 401 has not been installed, then she is prompted to install it.
- The bootstrapping JavaScript 900 (downloaded, for example, from the SMail server 505, step 161) determines the ATR of her smart card 104, messages 163 and 165, and sends it back to the SMail server 151 (using AJAX), step 167.
- The SMail server 151 looks up the database to determine the corresponding smart card specific PKCS#11 JavaScript Module (i.e., in the terminology used hereinabove, the card-specific driver 301) for the smart card 104 and sends it back in response to the previous request, step 169.
- Once the card specific driver 301 is downloaded it starts communicating with the smart card 104 (using the smart card resource manager web-browser application interface program 303). Secure communication is ensured by requiring that encrypted messages are sent to the smart card 104 from the server 511.
- The card specific driver 301 (now executing in the web-browser 203) prompts Alice with the PIN entry dialog box in order to authenticate to her smart card 104 or other login procedure, step 171.
- Once successfully authenticated, the appropriate certificate from Alice's smart card is chosen, step 173. In case her smart card 104 contains many certificates they are displayed and Alice is prompted to select one of them.
- After certificate selection the card specific driver 301 and, for example, an ASP.NET handler exchange data with the smart card 104 in order to sign the contents of Alice's mail, step 175. These communications are performed by placing calls on the smart card resource manager web-browser application interface program 303 for transmitting data to the smart card 104 as described herein above.

The signature is wrapped by the smart card 104 in accordance with the PGP specification, step 177.

The signed message is transmitted back to the web-browser, step 179, and by the web-browser on to the web mail application 151, step 181.

In an alternative embodiment, on access attempts to a smart card 104 by an application.js javascript 101 executing on a host computer 103 and to which the smart card 104 is connected is queried as to whether the user wishes to authorize the proposed interaction between the javascript 101 and the smart card 104. In one operating scenario, a website 505 may have been designed with malicious intent either to obtain confidential user information by tricking the user or to present a denial of service attack against the smart card 104. In the latter case, the application.js javascript 101 may, for example, have been designed to repeatedly present an incorrect login credential to the smart card 104. Most smart cards 104 have a limit on number of incorrect log in attempts permitted. When that limit is exceeded, the smart card 104 is locked and is not available for use absent some high-level intervention, e.g., from the card issuer.

Figure 11:
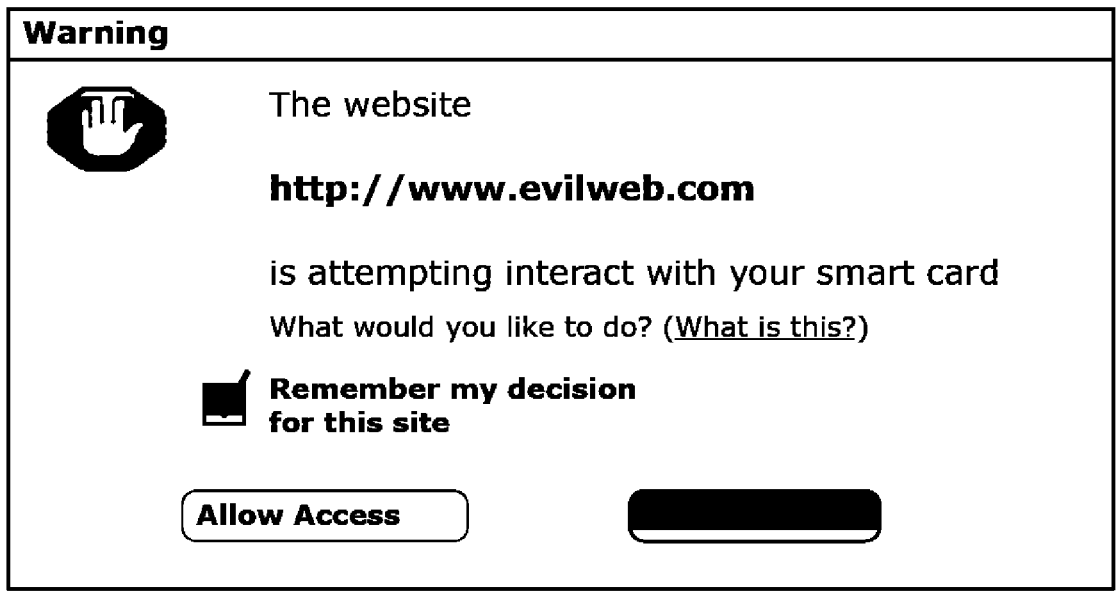
FIG. 11 is an example user dialog window allowing a user to give or deny approval for a website to interact with a smart card using a javascript downloaded from the website.
Figure 13:
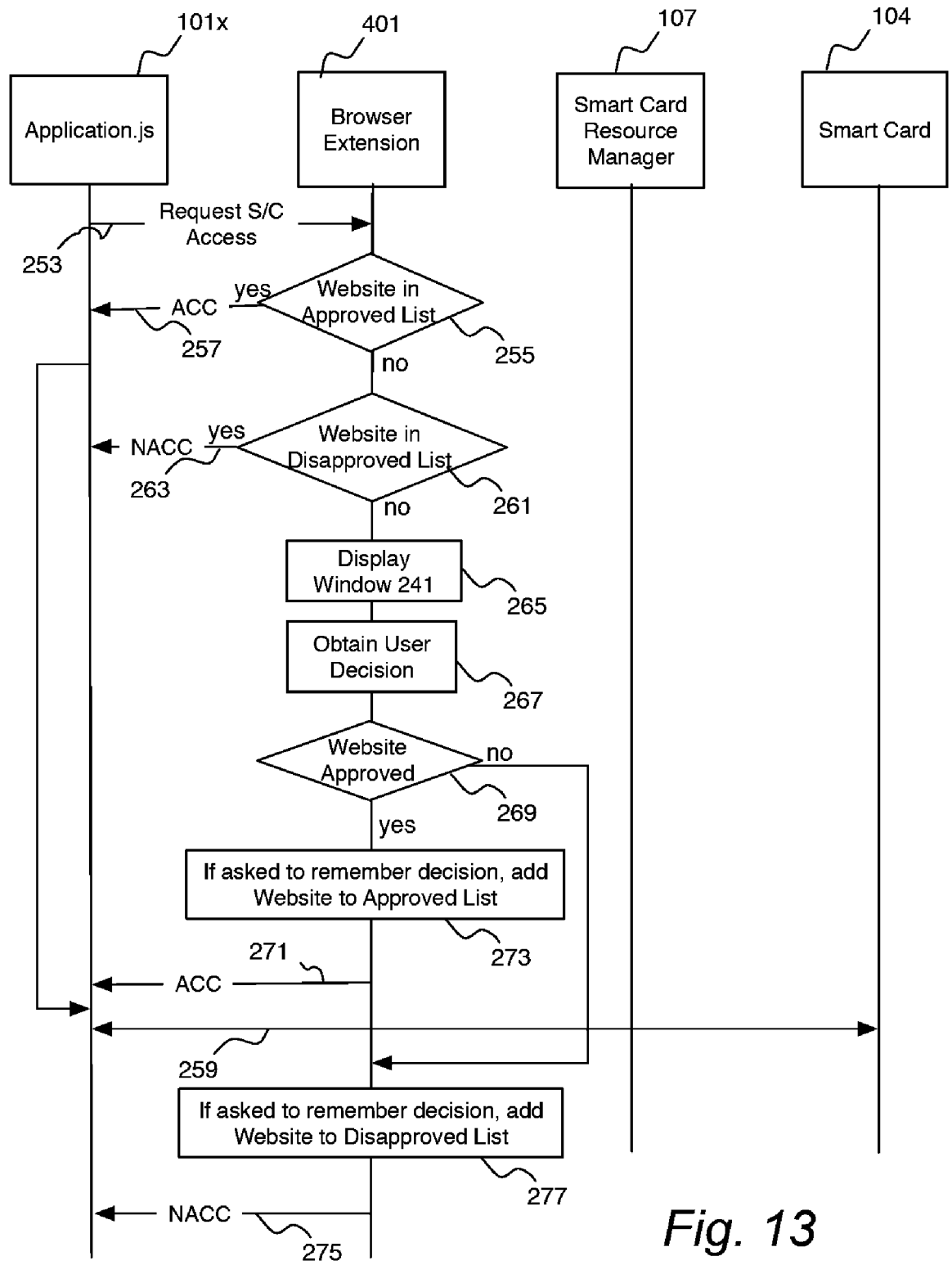
FIG. 13 is a timing sequence diagram illustrating process flow for allowing or not allowing a website to interact with a smart card using a javascript downloaded from a website.

FIG. 11 illustrates an example user dialog window displayed to the user when the web-browser extension 401 detects the attempt to access the smart card 104 and presents a dialog 241. In the event that the user wishes to approve interaction between the application.js javascript 101 and the smart card 104, the website url (or some other appropriate device for identifying the website) is added to an approved list. If the user denies access, the website is added to a disapproved list. This list is managed by a web-browser prescribed mechanism (for example, cookies).

FIG. 12 illustrates an example user dialog window 243 displayed to the user to edit the approved and disapproved lists of websites allowed/disallowed interact with the smart card 104. In one embodiment, the installation of the smart card resource manager web-browser application interface program 303 causes the addition of a menu item in the web-browser menus for displaying the dialog window 243, for example, under the web-browsers "Tool" menu.

FIG. 12 is a timing-sequence diagram illustrating the use of approved and disapproved lists to allow or deny an application javascript the right to interact with the smart card 104. A user has accessed a website (e.g., http://evilweb.com). That website seeks to deploy an attack on the smart card 104 by uploading an application javascript 101x. When the application javascript 101x requests to interact with the smart card 104, message 253, the web-browser extension 401 determines if the website from which the javascript originates is in the approved list, step 255.

If the website is on the approved list, an indication (e.g., an "ACC") is sent from the web-browser extension 401 to the javascript 101x, message 257, and interaction may commence, step 259.

If the website is not on the approved list, the web-browser extension 401 determines if it is in the disapproved list, step 261. If the website is on the disapproved list, a message indicating that (e.g., a "NACC") is sent from the web-browser extension 401 to the javascript 101x, message 263.

If the website is not on either list, the dialog window 241 (FIG. 11) is displayed for the user to decide whether it is permissible to proceed, step 265.

The user's decision as to whether to allow the website access is obtained, step 267. If the user approved the website for interaction with the smart card 104, step 269, a message indicating approval for the interaction (e.g., an "ACC") is sent to the javascript 101x, message 271, and interaction may commence, step 259. Optionally, e.g., if the user has clicked a check box in the dialog window 241 indicating that the decision should be remembered, the website is added to the approved list, step 273.

If the user denied the website the right to interact with the smart card 104, step 269, a message indicating disapproval for the interaction (e.g., a "NACC") is sent to the javascript 101x, message 275. Optionally, e.g., if the user has clicked a check box in the dialog window 241 indicating that the decision should be remembered, the website is added to the disapproved list, step 277.

From the foregoing it will be apparent that the technology described herein provides an efficient mechanism for seamlessly employing smart cards in the context of web applications. Cumbersome middleware layers traditionally required for communication between host applications and smart cards are avoided by loading a web web-browser extension into the web-browser and in an on-demand fashion loading a card-specific driver web-browser extension into the web-browser. These dynamically loaded extensions allow for the use of smart cards for many powerful applications provided by smart cards, for example, cryptography, in conjunction with web applications without requiring the web applications to be aware of web-browser specific or platform specific requirements for interacting with smart cards.

Although specific embodiments of the invention have been described and illustrated, the invention is not to be limited to the specific forms or arrangements of parts so described and illustrated. The invention is limited only by the claims.

We claim:

1. A client-side application extension executable on a host computer, having a central processing unit and a random access memory, from within a browser having the capability of executing at least one browser add-on to provide a user access to a smart card, connected to the host computer having a smart card resource manager, via the browser, the browser extension comprising:

instructions to direct the central processing unit to access data on the smart card, the instructions executing in a first thread and comprising:

a browser and platform independent interface module providing a browser and platform independent application program interface allowing the host computer to execute the at least one browser add-on to invoke functions of the browser extension, the application program interface providing at least one function for accessing data on the smart card;

a browser and platform dependent wrapper module connected to the browser and platform independent interface module and to the smart card resource manager having a function processing module operable to receive a call to the at least one function for accessing data on the smart card and for transforming the function call into a corresponding call to the smart card resource manager; and a call-back function operable responsive to a response received from the smart card in response to a command sent to the smart card resource manager, wherein a function call to the smart card resource manager spawns a new thread for execution of the function call and directs the host computer to return control to the first thread at the call-back function upon conclusion of the execution of the command sent to the smart card resource manager.

2. The client-side application extension of claim 1 wherein the browser and platform independent interface module and browser and platform dependent wrapper module comprise instructions loaded by the host computer into the browser.

3. The client-side application extension of claim 1 wherein the browser and platform dependent wrapper module comprises browser and platform dependent instructions executable by the host computer to invoke platform specific smart card resource manager functions for accessing the smart card.

4. The client-side application extension of claim 1 wherein the browser and platform dependent wrapper module detects smart card events transmitted by the smart card resource manager.

5. The client-side application extension of claim 4 wherein the browser and platform independent wrapper module receives smart card events transmitted by the smart card resource manager via the browser and platform dependent wrapper module.

6. The client-side application extension of claim 5 wherein the smart card events include card insertion, card removal, begin transaction, end transaction.

7. The client-side application extension of claim 1 wherein the function calls include message transmission to the smart card and reception of corresponding response from the smart card.

8. The client-side application extension of claim 1 wherein the browser extension further comprises instructions to:
   detect that a javascript downloaded from a website is attempting to interact with the smart card;
   in response to detecting that the javascript downloaded from a website is attempting to interact with the smart card, obtain a user's approval or disapproval of the interaction between the javascript and the smart card;
   in response to the user's approval, allow the interaction to proceed;
   in response to the user's disapproval, disallow the interaction from proceeding.

9. The client-side application extension of claim 8 wherein the browser extension further comprises instructions to:
   in response to the user's approval, adding the website to a list of websites allowed to interact with the smart card.

10. The client-side application extension of claim 8 wherein the browser extension further comprises instructions to:
    to manage the list of websites allowed to interact with the smart card including code to remove websites from the list of websites allowed to interact with the smart card.

11. The client-side application extension of claim 8 wherein the browser extension further comprises instructions to:
    in response to the user's disapproval, adding the website to a list of websites not allowed to interact with the smart card.

12. The client-side application extension of claim 11 wherein the browser extension further comprises instructions to:
    to manage the list of websites not allowed to interact with the smart card including code to remove websites from the list of websites not allowed to interact with the smart card.

13. The client-side application extension of claim 8 wherein the browser extension further comprises instructions to:
    display a user interaction window to allow the user to indicate approval or disapproval for the interaction between the javascript and the smart card.

14. A method of operating a computer system to use a browser to access data stored in a smart card connected to the host computer, the host computer having a central processing unit and a random access memory, and a smart card resource manager, and the browser having the capability of executing at least one browser add-on comprising:
    executing a browser application requesting access to data on the smart card via the smart card resource manager;
    in response to a request by the browser application to access data on the smart card:
    instantiating an interface object from a script module, the interface object providing at least one method for making access calls to a smart card resource manager interface browser extension;
    making a call on a method of the interface object in a first thread;
    in response to receiving a call on the method of the interface object, making a call on the smart card resource manager interface browser extension in a new thread for execution of the function call and directs the host computer to return control to the first thread at a specified call-back function upon conclusion of the execution of the command sent to the smart card resource manager wherein the call-back function is operable responsive to a response received from the smart card in response to a command sent to the smart card resource manager;
    in response to receiving a call on the smart card resource manager interface browser extension, making a call from the smart card resource manager browser extension to the smart card resource manager;
    receiving a response from the smart card resource manager; and
    displaying a result indicative of the response from the smart card resource manager in a browser window thereby providing a user access to smart card data via the browser.

15. The method of operating a computer system to use a browser to access data stored in a smart card connected to the host computer of claim 14 wherein the smart card resource manager interface browser extension comprises browser and platform dependent instructions executable by the host computer to invoke platform specific smart card resource manager functions for accessing the smart card.

16. The method of operating a computer system to use a browser to access data stored in a smart card connected to the host computer of claim 14 further comprising:
    detecting by the smart card resource manager interface browser extension smart card events transmitted by the smart card resource manager.

17. The method of operating a computer system to use a browser to access data stored in a smart card of claim 16 wherein the interface object receives smart card events transmitted by the smart card resource manager via the smart card resource manager interface browser extension.

18. The method of operating a computer system to use a browser to access data stored in a smart card of claim 17 wherein the smart card events include card insertion, card removal, begin transaction, end transaction.

19. The method of operating a computer system to use a browser to access data stored in a smart card of claim 14 wherein the method calls include message transmission to the smart card and reception of corresponding response from the smart card.

20. The method of operating a computer system to use a browser to access data stored in a smart card of claim 14 wherein the browser extension further comprises:
    detecting that a javascript downloaded from a website is attempting to interact with the smart card;
    in response to detecting that the javascript downloaded from a website is attempting to interact with the smart card, obtaining a user's approval or disapproval of the interaction between the javascript and the smart card;
in response to the user's approval, allowing the interaction to proceed;
in response to the user's disapproval, disallowing the interaction from proceeding.

21. The method of operating a computer system of claim 20 further comprising:
in response to the user's approval, adding the website to a list of websites allowed to interact with the smart card.

22. The method of operating a computer system to use a browser to access data stored in a smart card of claim 21 further comprising:
managing the list of websites allowed to interact with the smart card including selectively removing websites from the list of websites allowed to interact with the smart card.

23. The method of operating a computer system to use a browser to access data stored in a smart card of claim 20 further comprising:
in response to the user's disapproval, adding the website to a list of websites not allowed to interact with the smart card.

24. The method of operating a computer system to use a browser to access data stored in a smart card of claim 23 further comprising:
managing the list of websites not allowed to interact with the smart card including removing websites from the list of websites not allowed to interact with the smart card.

25. The method of operating a computer system to use a browser to access data stored in a smart card of claim 20 further comprising:
displaying a user interaction window to allow the user to indicate approval or disapproval for the interaction between the javascript and the smart card.

26. A computer storage medium accessible as a server in a client-server relationship, having stored thereon instructions executable by a host computer connected to a smart card and having loaded thereon a smart card resource manager having instructions to enable the host computer to access the smart card, wherein when loaded onto the host computer, the instructions include instructions providing:
at least one browser and platform dependent wrapper module each with an interface to a browser and platform independent interface module and to the smart card resource manager having a function processing module operable to receive a call to the at least one function for accessing data on the smart and for transforming the function call into a corresponding call to the smart card resource manager;
a browser and platform independent interface module providing a browser and platform independent application program interface allowing the host computer to execute the at least one browser add-on to invoke functions of the browser extension, the application program interface providing at least one function for accessing data on the smart card; and
a call-back function operable responsive to a response received from the smart card in response to a command sent to the smart card resource manager wherein a function call to the smart card resource manager spawns a new thread for execution of the function call and directs the host computer to return control to the first thread at the call-back function upon conclusion of the execution of the command sent to the smart card resource manager.

27. The computer storage medium accessible as a server in a client-server relationship of claim 26 wherein the browser and platform independent interface module and browser and platform dependent wrapper module comprise instructions loaded by the host computer into the browser.

28. The computer storage medium accessible as a server in a client-server relationship of claim 26 wherein the browser and platform dependent wrapper module comprises browser and platform dependent instructions executable by the host computer to invoke platform specific smart card resource manager functions for accessing the smart card.

29. The computer storage medium accessible as a server in a client-server relationship of claim 26 wherein the browser and platform dependent wrapper module detects smart card events transmitted by the smart card resource manager.

30. The computer storage medium accessible as a server in a client-server relationship of claim 29 wherein the browser and platform independent wrapper module receives smart card events transmitted by the smart card resource manager via the browser and platform dependent wrapper module.

31. The computer storage medium accessible as a server in a client-server relationship of claim 30 wherein the smart card events include card insertion, card removal, begin transaction, end transaction.

32. The computer storage medium accessible as a server in a client-server relationship of claim 26 wherein the function calls include message transmission to the smart card and reception of corresponding response from the smart card.

33. The computer storage medium accessible as a server in a client-server relationship of claim 26 wherein the browser extension further comprises instructions to:
detect that a javascript downloaded from a website is attempting to interact with the smart card;
in response to detecting that the javascript downloaded from a website is attempting to interact with the smart card, obtain a user's approval or disapproval of the interaction between the javascript and the smart card;
in response to the user's approval, allow the interaction to proceed;
in response to the user's disapproval, disallow the interaction from proceeding.

34. The computer storage medium accessible as a server in a client-server relationship of claim 33 wherein the browser extension further comprises instructions to:
in response to the user's approval, adding the website to a list of websites allowed to interact with the smart card.

35. The computer storage medium accessible as a server in a client-server relationship of claim 34 wherein the browser extension further comprises instructions to:
to manage the list of websites allowed to interact with the smart card including code to remove websites from the list of websites allowed to interact with the smart card.

36. The computer storage medium accessible as a server in a client-server relationship of claim 33 wherein the browser extension further comprises instructions to:
in response to the user's disapproval, adding the website to a list of websites not allowed to interact with the smart card.

37. The computer storage medium accessible as a server in a client-server relationship of claim 36 wherein the browser extension further comprises instructions to:
to manage the list of websites not allowed to interact with the smart card including code to remove websites from the list of websites not allowed to interact with the smart card.

38. The computer storage medium accessible as a server in a client-server relationship of claim 33 wherein the browser extension further comprises instructions to:

display a user interaction window to allow the user to indicate approval or disapproval for the interaction between the javascript and the smart card.

39. A client-side application extension executable on a host computer, having a central processing unit and a random access memory, from within a browser having the capability of executing at least one browser add-on to provide a user access to a smart card, connected to the host computer having a smart card resource manager, via the browser, the browser extension comprising:
instructions to direct the central processing unit to access data on the smart card executable in a first thread, the instructions comprising:
a browser and platform independent interface module providing a browser and platform independent application program interface allowing the host computer to execute the at least one browser add-on to invoke functions of the browser extension, the application program interface providing at least one function for accessing data on the smart card;
a browser and platform dependent wrapper module connected to the browser and platform independent interface module and to the smart card resource manager having a function processing module operable to receive a call to the at least one function for accessing data on the smart card and for transforming the function call into a corresponding call to the smart card resource manager;
a connection module operable to cause the host computer to execute instructions of the smart card resource manager to establish a communications connection to the smart card;
a call-back function operable responsive to a response received from the smart card in response to a command sent to the smart card resource manager;
wherein execution of the connection module spawns a new thread for execution of the instructions of the smart card resource manager to establish a connection to the smart card and directs the host computer to return control to the first thread at the call-back function upon conclusion of the execution of the instructions of the smart card resource manager to establish a connection to the smart card.

40. A method of operating a computer system to use a browser to access data stored in a smart card connected to the host computer, the host computer having a central processing unit and a random access memory, and a smart card resource manager, and the browser having the capability of executing at least one browser add-comprising:
executing a browser application requesting access to data on the smart card via the smart card resource manager;
in response to a request by the browser application to access data on the smart card:
instantiating an interface object from a script module, the interface object providing at least one method for making access calls to a smart card resource manager interface browser extension;
making a call in a first thread on a method of the interface object to access data on the smart card;
in response to receiving a call on the method of the interface object to access data on the smart card, making a call on the smart card resource manager interface browser extension;
in response to receiving a call on the smart card resource manager interface browser extension, making a call from the smart card resource manager browser extension to the smart card resource manager by spawning a new thread for execution of the function call and directing the host computer to return control to the first thread at a specified call-back function upon conclusion of the execution of the command sent to the smart card resource manager wherein the call-back function is operable responsive to a response received from the smart card in response to a command sent to the smart card resource manager;
receiving a response from the smart card resource manager; and
displaying a result indicative of the response from the smart card resource manager in a browser window thereby providing a user access to smart card data via the browser.

41. A computer storage medium accessible as a server in a client-server relationship, having stored thereon instructions executable by a host computer connected to a smart card and having loaded thereon a smart card resource manager having instructions to enable the host computer to access the smart card, wherein when loaded onto the host computer, the instructions include instructions providing:
at least one browser and platform dependent wrapper module each with an interface to a browser and platform independent interface module and to the smart card resource manager having a function processing module operable to receive a call to the at least one function for accessing data on the smart and for transforming the function call into a corresponding call to the smart card resource manager;
a browser and platform independent interface module providing a browser and platform independent application program interface allowing the host computer to execute the at least one browser add-on to invoke functions of the browser extension, the application program interface providing at least one function for accessing data on the smart card;
a connection module operable to cause the host computer to execute instructions of the smart card resource manager to establish a communications connection to the smart card; and
a call-back function operable responsive to a response received from the smart card in response to a command sent to the smart card resource manager;
wherein the instructions to enable the host computer to access the smart card are executable in a first thread and wherein execution of the connection module spawns a new thread for execution of the instructions of the smart card resource manager to establish a connection to the smart card and directs the host computer to return control to the first thread at the call-back function upon conclusion of the execution of the instructions of the smart card resource manager to establish a connection to the smart card.

42. A client-side application extension executable on a host computer, having a central processing unit and a random access memory, from within a browser having the capability of executing at least one browser add-on to provide a user access to a smart card, connected to the host computer having a smart card resource manager, via the browser, the browser extension comprising:
instructions to direct the central processing unit to access data on the smart card, the instructions comprising:
a browser and platform independent interface module providing a browser and platform independent application program interface allowing the host computer to execute the at least one browser add-on to invoke functions of the browser extension, the application program interface providing at least one function for accessing data on the smart card;

a browser and platform dependent wrapper module connected to the browser and platform independent interface module and to the smart card resource manager having a function processing module operable to receive a call to the at least one function for accessing data on the smart card and for transforming the function call into a corresponding call to the smart card resource manager; and an on-demand driver module for obtaining an appropriate smart-card driver browser extension corresponding to a smart card connected to the host computer, the on-demand driver module comprising instructions to cause the host computer to:

obtain an identifying string from the smart card and transmitting the identifying string to a smart-card driver server;

obtain from the smart-card driver server a first response indicating whether a driver for the smart card is available, wherein the response indicating whether a driver for the smart card is available includes a further identifying command from the smart-card driver server;

instructions to direct the smart card to execute the further identifying command;

instructions to receive a response from the smart card to the further identifying command;

instructions to transmit the response from the smart card to the smart-card driver server; and instructions to receive a second response from the smart card driver server including a driver for the smart card or a response message with a further command to be executed by the smart card to identify the smart card.

43. The client-side application extension of claim 42 wherein the first response includes a driver browser add-in corresponding to the smart card.

44. The client-side application extension of claim 42 wherein the first response includes an indication that the smart card cannot be conclusively identified and a command for the smart card to execute wherein the expected response from the smart card conclusively determines the identity of the card.

45. The client-side application extension of claim 42 further comprising instructions to cause the host computer to repeat the steps of transmitting the smart card response, receiving responses from the smart card driver server with either a driver for the smart card or a response message with a further command to be executed by the smart card to identify the smart card until a smart card driver browser extension is received or until the response message from the smart card driver server responds with a message that the smart card is not supported.

46. A method of operating a computer system to use a browser to access data stored in a smart card connected to the host computer, the host computer having a central processing unit and a random access memory, and a smart card resource manager, and the browser having the capability of executing at least one browser add-comprising:

executing a browser application requesting access to data on the smart card via the smart card resource manager;

in response to a request by the browser application to access data on the smart card:

instantiating an interface object from a script module, the interface object providing at least one method for making access calls to a smart card resource manager interface browser extension;

making a call on a method of the interface object;

in response to receiving a call on the method of the interface object, making a call on the smart card resource manager interface browser extension;

in response to receiving a call on the smart card resource manager interface browser extension, making a call from the smart card resource manager browser extension to the smart card resource manager;

receiving a response from the smart card resource manager;

displaying a result indicative of the response from the smart card resource manager in a browser window thereby providing a user access to smart card data via the browser;

obtaining an identifying string from the smart card and transmitting the identifying string to a smart-card driver server;

obtaining from the smart-card driver server a first response indicating whether a driver for the smart card is available;

in response to the response indicating whether a driver for the smart card is available includes a further identifying command from the smart-card driver server, executing the instructions to direct the smart card to execute the further identifying command;

receiving a response from the smart card to the further identifying command;

transmitting the response from the smart card to the smart-card driver server; and receiving a second response from the smart card driver server including a driver for the smart card or a response message with a further command to be executed by the smart card to identify the smart card.

47. The method of operating a computer system to use a browser to access data stored in a smart card of claim 46 wherein the first response includes a driver browser add-in corresponding to the smart card.

48. The method of operating a computer system to use a browser to access data stored in a smart card of claim 46 wherein the first response includes an indication that the smart card cannot be conclusively identified and a command for the smart card to execute wherein the expected response from the smart card conclusively determines the identity of the card.

49. The method of operating a computer system to use a browser to access data stored in a smart card of claim 46 further comprising repeating the steps of transmitting the smart card response, receiving responses from the smart card driver server with either a driver for the smart card or a response message with a further command to be executed by the smart card to identify the smart card until a smart card driver browser extension is received or until the response message from the smart card driver server responds with a message that the smart card is not supported.

50. A computer storage medium accessible as a server in a client-server relationship, having stored thereon instructions executable by a host computer connected to a smart card and having loaded thereon a smart card resource manager having instructions to enable the host computer to access the smart card, wherein when loaded onto the host computer, the instructions include instructions providing:

at least one browser and platform dependent wrapper module each with an interface to a browser independent interface module and to the smart card resource manager having a function processing module operable to receive a call to the at least one function for accessing data on the smart and for transforming the function call into a corresponding call to the smart card resource manager;

a browser and platform independent interface module providing a browser and platform independent application program interface allowing the host computer to execute the at least one browser add-on to invoke functions of the browser extension, the application program interface providing at least one function for accessing data on the smart card;

an on-demand driver module for obtaining an appropriate smart-card driver browser extension corresponding to a smart card connected to the host computer, the on-demand driver module comprising instructions to cause the host computer to:

obtain an identifying string from the smart card and transmitting the identifying string to a smart-card driver server;

obtain from the smart-card driver server a first response indicating whether a driver for the smart card is available;

wherein the response indicating whether a driver for the smart card is available includes a further identifying command from the smart-card driver server;

instructions to direct the smart card to execute the further identifying command;

instructions to receive a response from the smart card to the further identifying command;

instructions to transmit the response from the smart card to the smart-card driver server; and instructions to receive a second response from the smart card driver server including a driver for the smart card or a response message with a further command to be executed by the smart card to identify the smart card.

51. The computer storage medium accessible as a server in a client-server relationship of claim 50 wherein the first response includes a driver browser add-in corresponding to the smart card.

52. The computer storage medium accessible as a server in a client-server relationship of claim 50 wherein the first response includes an indication that the smart card cannot be conclusively identified and a command for the smart card to execute wherein the expected response from the smart card conclusively determines the identity of the card.

53. The computer storage medium accessible as a server in a client-server relationship of claim 50, the on-demand driver module further comprising:

wherein the response indicating whether a driver for the smart card is available includes a further identifying command from the smart-card driver server;

instructions to direct the smart card to execute the further identifying command;

instructions to receive a response from the smart card to the further identifying command;

instructions to transmit the response from the smart card to the smart-card driver server; and instructions to receive a second response from the smart card driver server including a driver for the smart card or a response message with a further command to be executed by the smart card to identify the smart card.

54. The computer storage medium accessible as a server in a client-server relationship of claim 53 further comprising instructions to cause the host computer to repeat the steps of transmitting the smart card response, receiving responses from the smart card driver server with either a driver for the smart card or a response message with a further command to be executed by the smart card to identify the smart card until a smart card driver browser extension is received or until the response message from the smart card driver server responds with a message that the smart card is not supported.

* * * * *